United States Patent [19]
Massey et al.

[11] Patent Number: 5,802,651
[45] Date of Patent: *Sep. 8, 1998

[54] DOCK LEVELER WITH A MOVABLE RAMP AND AN INFLATABLE MEMBER

[75] Inventors: Douglas H. Massey, New Berlin; Bruce Winter, Muskego, both of Wis.

[73] Assignee: Kelley Company, Inc., Milwaukee, Wis.

[*] Notice: The term of this patent shall not extend beyond the expiration date of Pat. No. 5,522,108.

[21] Appl. No.: 657,116

[22] Filed: Jun. 3, 1996

Related U.S. Application Data

[63] Continuation-in-part of Ser. No. 381,083, Jan. 31, 1995, Pat. No. 5,522,108.

[51] Int. Cl.⁶ .............................. E01D 1/00; E01D 18/00
[52] U.S. Cl. ..................... 14/71.3; 14/71.7; 254/93 HP
[58] Field of Search ................................. 14/71.1, 71.3, 14/71.5, 71.7, 69.5; 254/1, 89 H, 89 R, 93 HP; 5/451; 410/119, 125

[56] References Cited

U.S. PATENT DOCUMENTS

| | | |
|---|---|---|
| 2,610,824 | 9/1952 | Grier . |
| 3,379,411 | 4/1968 | Vanderjagt . |
| 3,521,861 | 7/1970 | Freudenthal et al. . |
| 3,659,899 | 5/1972 | Phillips et al. . |
| 3,711,157 | 1/1973 | Smock . |
| 3,784,255 | 1/1974 | Smock . |
| 4,538,311 | 9/1985 | Hall et al. . |
| 4,572,579 | 2/1986 | Saito . |
| 5,042,103 | 8/1991 | Megens . |
| 5,067,774 | 11/1991 | Trowland . |
| 5,446,938 | 9/1995 | Warner et al. . |
| 5,450,643 | 9/1995 | Warner . |
| 5,471,693 | 12/1995 | Hodges . |
| 5,522,108 | 6/1996 | Massey et al. . |

*Primary Examiner*—James Lisehora
*Attorney, Agent, or Firm*—Michael, Best & Friedrich

[57] ABSTRACT

A dock leveler comprising a ramp movable between a lowered position and a raised position, an inflatable member positioned to move the ramp to its raised position upon inflation of the inflatable member, and an inflating device operatively connected with the internal cavity. The inflatable member includes upper and lower portions at least partially defining an internal cavity. An insert member is positioned in the internal cavity for maintaining a volume of gas between the upper and lower portions. Preferably, the insert member functions to maintain the inflatable member in engagement with a downwardly facing surface of the ramp, thereby inhibiting the presence of debris between the inflatable member and the ramp, and further expediting inflation of the inflatable member.

18 Claims, 3 Drawing Sheets

DOCK LEVELER WITH A MOVABLE RAMP AND AN INFLATABLE MEMBER

REFERENCE TO RELATED APPLICATIONS

This is a continuation-in-part of commonly-assigned and U.S. patent application Ser. No. 08/381,083, filed Jan. 31, 1995, issued as U.S. Pat. No. 5,522,108 on Jun. 4, 1996.

FIELD OF THE INVENTION

This invention generally relates to the field of dock levelers, and more particularly to dock levelers having a ramp movable from a lowered position to a raised position by inflation of an inflatable member disposed below the ramp.

BACKGROUND OF THE INVENTION

Dock levelers typically includes a ramp for bridging the space between a loading dock and the bed of a truck or other carrier parked adjacent the loading dock. The ramp is movable between a horizontal rest position and an inclined raised position. A lip is mounted to the outer end of the ramp and is disposed in a pendant inoperative position when the ramp is in a rest position. In operation, the ramp lifted to a raised position, then subsequently lowered moving the lip from the pendent position to an operative position. The ramp continues to lower until the lip engages the truck bed that provides support for the outer end of the ramp.

One type of dock leveler, disclosed in U.S. Pat. No. 5,042,103, utilizes an inflatable airbag to raise and lower the ramp. The airbag can be selectively inflated using a blower that delivers low-pressure air to the interior of the airbag to thereby raise the ramp. After the ramp has been lifted to its raised position, the blower is deactivated, and the air within the airbag is removed to thereby deflate the airbag and lower the ramp.

Recent developments in airbag-inflated dock leveler technology are disclosed in U.S. patent ppplications Ser. No. 08/131,981 filed Oct. 4, 1993 and Ser. No. 08/131,983 filed Oct. 4, 1993. In these disclosures, the inflatable member or airbag is inflated using an inflating device which can be any source of pressurized air. In one form, a fan or blower is mounted on the airbag support or on the ramp, delivers low-pressure air to the interior of the airbag assembly and inflates the airbag assembly which raises the ramp. In the past, to move the ramp to its raised position required the initial step of filling the interior of the airbag assembly with a sufficient supply of air to completely occupy its entire defined volume. The fan or blower would operate for several seconds without any movement whatsoever of the ramp. Only when the airbag assembly was filled, did the actual lifting of the ramp commence.

Moreover, the airbag assembly is typically constructed such that, when pressurized air is removed from the interior of the airbag assembly, the airbag assembly collapses under its own weight. Thus, a space is created between the upper surface of the airbag assembly and the underside of the ramp. This space could collect debris or other objects which could prematurely wear or puncture the airbag upon inflation of the airbag and engagement with the underside of the ramp.

It is an object of the present invention to provide a means for expediting inflation of the inflatable member of a dock leveler with a gas upon operation of an inflating device. It is a further object of the invention to provide such a means which does not affect the overall structure or construction of either the inflatable member or any other component of the dock leveler. A still further object of the invention is to provide a means for maintaining the inflatable member in engagement with the underside of the ramp in order to eliminate the space between the bag and the ramp in which debris or other objects can collect.

SUMMARY OF THE INVENTION

The present invention improves on the above-described dock levelers by providing an insert member inside the inflatable member. The insert member maintains a large volume of gas within the inflatable member after deflation. This feature advantageously decreases subsequent inflation time of the inflatable member since there is no need to initially fill the inflatable member. In addition, this feature maintains the top of the inflatable member near the bottom surface of the ramp, thereby inhibiting the entrapment of debris between the ramp and the bag. Such debris can prematurely wear and puncture the bag.

In one aspect, the present invention provides a dock leveler comprising a ramp movable between a lowered position and a raised position, an inflatable member positioned to move the ramp to its raised position upon inflation of the inflatable member, and an inflating device operatively connected with the internal cavity. The inflatable member includes upper and lower portions at least partially defining an internal cavity. In accordance with the present invention, an insert member is positioned in the internal cavity for maintaining a volume of gas between the upper and lower portions. Preferably, the insert member functions to maintain the inflatable member in engagement with a downwardly facing surface of the ramp, thereby inhibiting the presence of debris between the inflatable member and the ramp.

The inflatable member can include a bag assembly having a plurality of chambers, and the insert member can be positioned in at least one of the chambers. Preferably, the insert member is made of resilient foam material, and is more preferably wedge shaped. Alternatively, the insert member can comprise a compression spring, a bellows, or an airbag.

In another aspect, the present invention provides a dock leveler comprising a ramp movable between a lowered position and a raised position, an inflatable member positioned to move the ramp to its raised position upon inflation of the inflatable member, and an inflating device operatively connected with the internal cavity. The inflatable member includes upper and lower portions at least partially defining an internal cavity. In accordance with the present invention, the dock leveler further includes means for maintaining a volume of gas between the upper and lower portions.

The maintaining means preferably includes a wedge shaped piece of resilient foam material. Alternatively, the maintaining means can includes a compression spring, a bellows, an airbag, or a valving mechanism which maintains a predetermined quantity of gas inside the inflatable member.

DETAILED DESCRIPTION

Figure 1:
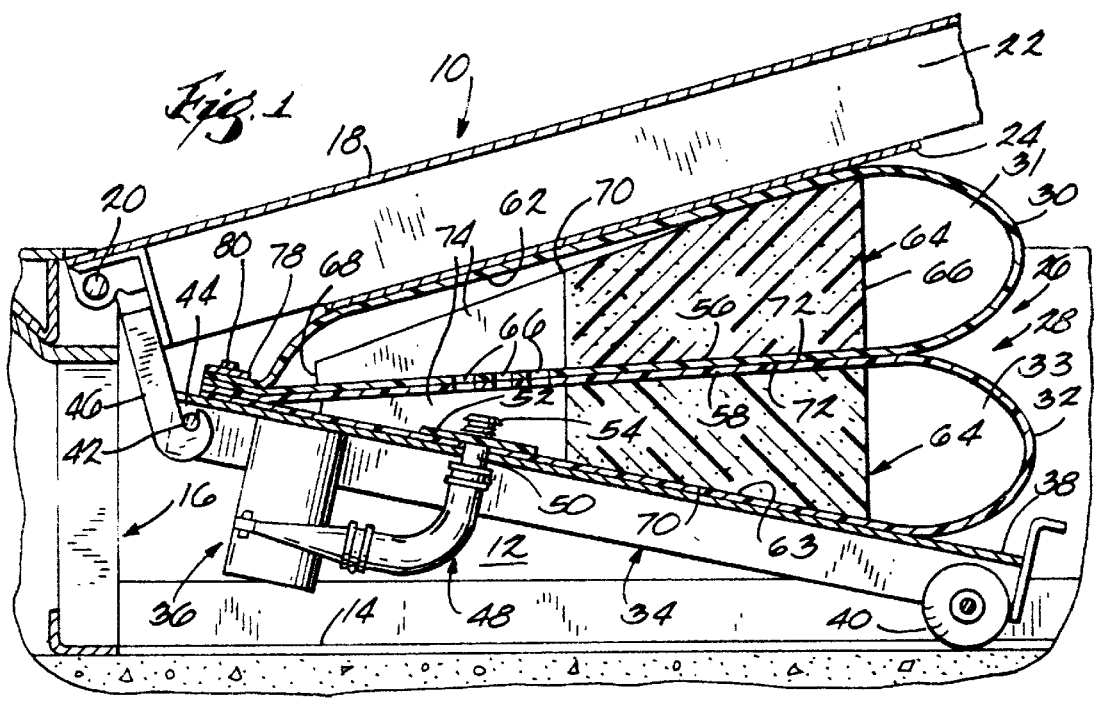
FIG. 1 is a partial vertical section view of a dock leveler assembly embodying the invention and wherein the inflatable member is a bag assembly comprising two bags and wherein insert members are positioned within the internal cavities of each bag.
Figure 3:
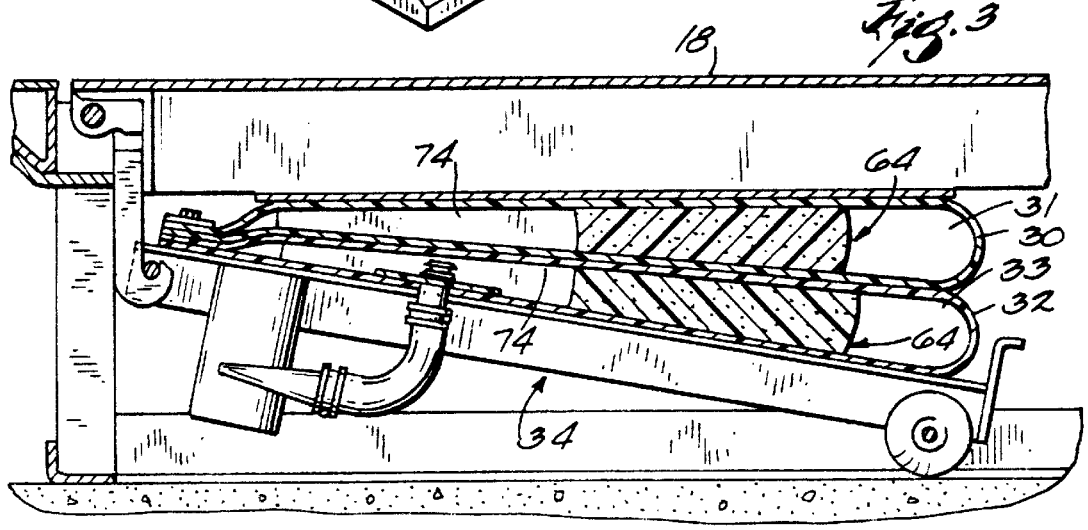
FIG. 3 is the dock leveler assembly of FIG. 1 shown with the dock leveler ramp in its normal rest position and the insert members compressed.

FIGS. 1 and 3 are section views of a first embodiment of the invention. These figures will be used to illustrate the basic elements of the invention and its operation.

In FIG. 1, a dock leveler 10 is mounted in a pit or depression 12 in a loading dock. To facilitate loading or unloading, the dock leveler 10 is adapted to bridge the gap between the upper surface of the loading dock and the bed of a parked truck or carrier (not shown).

Dock leveler 10 includes a frame or supporting structure 16 mounted in the pit 12, and a ramp or deck plate 18 with the rear end pivotably mounted to the upper end of the frame 16 via one or more pins 20. The ramp 18 is movable between a generally horizontal dock level position as shown in FIG. 3, in which the ramp 18 is flush and substantially coplanar with the upper surface of the loading dock, and an upwardly inclined raised position as shown in FIG. 1. An extension lip (not shown) is hinged to the forward end of the ramp 18 via hinge pins or the like. Normally, the lip is in a pendant position but can be moved by any conventional means to an extended position when the ramp 18 is lowered from its raised position. When extended, the lip becomes coplanar with ramp 18 forming an extension after the lip comes to rest on the bed of the truck or carrier upon downward movement of ramp 18 from its raised position.

The ramp 18 is supported by a series of beams 22 which extend in a longitudinal front-rear direction between the forward and rearward ends of the ramp 18. A downwardly facing pressure plate 24 extends across the beams 22 toward the rearward ends of the beams 22, and is mounted against the lower surfaces of the beams 22 in any satisfactory manner such as by riveting, bolting, welding or the like. A lifting assembly 26 is disposed between the plate 24 and the pit floor 14 and includes an inflatable member 28 and an inflating device 36. The upper surface of the lifting assembly 26 may be secured to the underside of the ramp 18 by means such as by bolting by buttoning, by adhesives, or by velcro.

The lifting assembly 26 further includes an inflatable member support assembly 34. The support assembly 34 includes a support plate 38 that defines an upper surface engaging the lower surface of the inflatable member 28. Wheels 40 are mounted to the forward end of the support assembly 34 and engage the pit floor 14. A pin or shaft 42 is provided at the rearward end of the inflatable support 34, and is received within a series of upwardly facing slots 44 formed in bracket members 46 extending downwardly from the rearward end of the ramp 18.

The inflating device 36 may be in the form of a fan or blower. The fan or blower 36 is mounted at any satisfactory location such as a lower surface defined by the support plate 38. A pipe assembly 48 extends between the discharge of the inflating device 36 and the interior of the inflatable member 28. Alternatively, pressurized gas can be supplied to the inflatable member 28 from any satisfactory source such as pressurized shop air. The pipe assembly 48 includes a discharge nipple 50 which extends through aligned openings formed in the support plate 38 and in the lower wall of the inflatable member 26, with the nipple 50 having its end disposed within an internal cavity 33 of the inflatable member 28. The nipple 50 is provided with outer barbs 54 which are engaged with a flexible molded mounting ring 52, such as flexible PVC secured to the lower wall of the inflatable member 28.

In a first embodiment of the invention as shown in FIGS. 1 and 3, inflatable member 28 is a bag assembly including an upper bag 30 defining an internal cavity 31 and a lower bag 32 defining an internal cavity 33. The bags 30, 32 are vertically superimposed, with the upper bag 30 overlying the lower bag 32. The construction of bag assembly 28 is illustrated and described in copending U.S. patent application Ser. No. 08/131,981 filed Oct. 4, 1993. The bags 30, 32 are preferably formed of fabric coated with a thermoplastic resin. The bags 30, 32 have contiguous horizontal walls 56, 58, respectively, in which aligned openings 60 are formed to establish communication between the internal cavities 31, 33 of the bags 30, 32, respectively. To raise the ramp 18 to its raised position shown in FIG. 1, the upper surface of the upper bag 30, defined by an upper wall 62, bears against the pressure plate 24 and the lower surface of lower bag 32, defined by a lower wall 63, bears against the support plate 38.

Insert members 64 are positioned within the internal cavities 31, 33 and are constructed so as to occupy a majority of the volume defined by the internal cavities 31, 33. The insert members 64, in any embodiment of the invention, can be of any satisfactory form, preferably a resilient, compressible material or structure. In one form, the insert member 64 is formed from foam material. In other forms, the insert members 64 can be compression springs, a bellows-like structure, a plurality of airbags or any other resiliently compliant structure.

Figure 2:
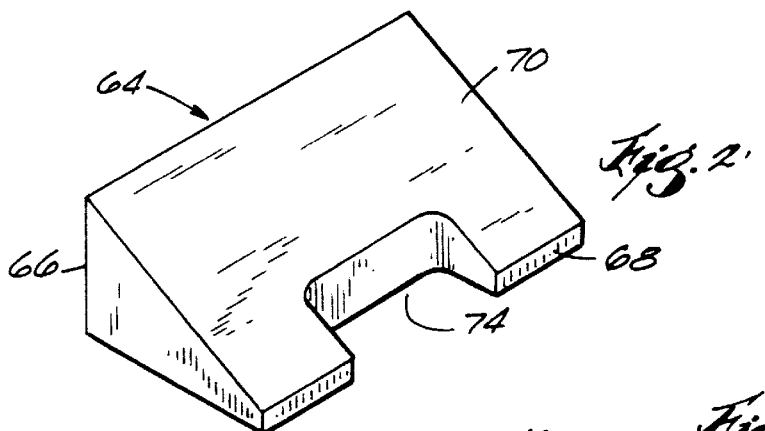
FIG. 2 is an isometric view of an insert member for placement into the interior of the bag assembly for the dock leveler assembly of FIG. 1.

In the embodiment illustrated in FIGS. 1, 2 and 3, the insert members 64 are formed from foam material and are wedge-shaped, with each defining a front surface 66, a rear surface 68, a top surface 70 and a bottom surface 72. The front surface 66 has a height significantly greater than the rear surface 68. Each insert member 64 includes a cut-out 74 extending between the lower surface 72 and the upper surface 70 forwardly from the rear surface 68. Each cut-out 74 extends throughout the central portion of the rear wall 68. The cut-outs 74 are in communication with the discharge of the outlet nipple 50, and with the openings 60 in the bag walls 56, 58.

FIG. 2 illustrates an insert member 64 prior to placement within the cavities 31 and 33. After the insert members 64 are placed into the cavities 31, 33, the rear ends of the bag walls 56, 58, 62 and 63 are brought into overlying relationship with each other adjacent the rearward end of the support 34 by folding the material of the bags 30 and 32. At that time, the insert members 64 are secured within the cavities 31 and 33. Then, the rear ends of the bag walls 56, 58, 62 and 63 are secured to the support plate 38 using a clamp bar 78 and a series of bolts 80 and associated nuts, or by any other satisfactory mounting method.

Figure 4:
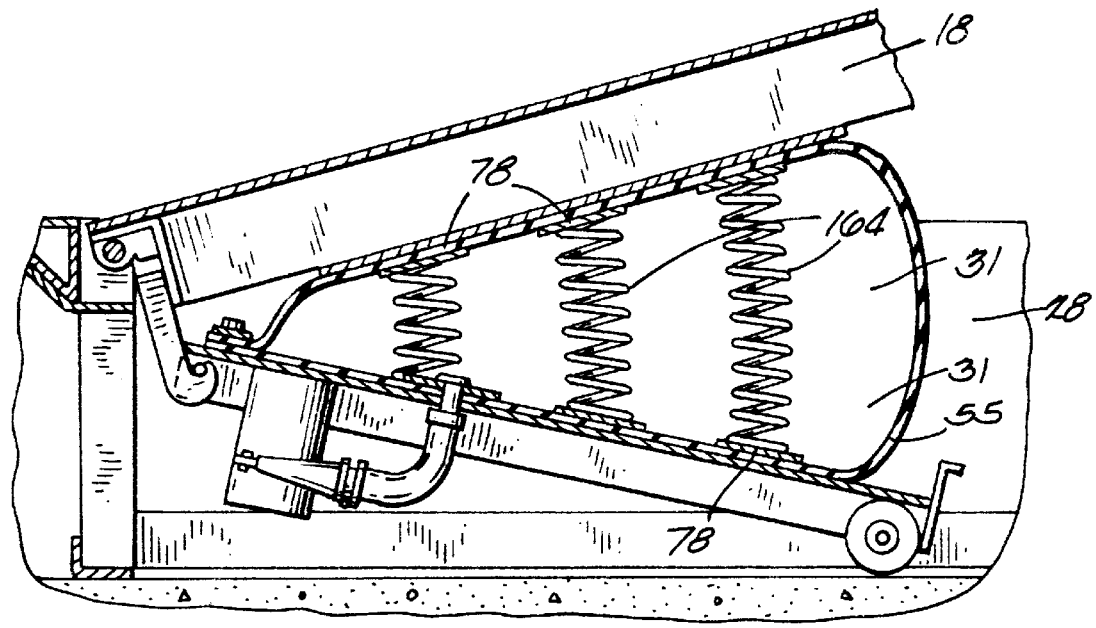
FIG. 4 is a section view of an alternative embodiment of the invention in which the inflatable member is a single bag and the insert members are compression springs.
Figure 5:
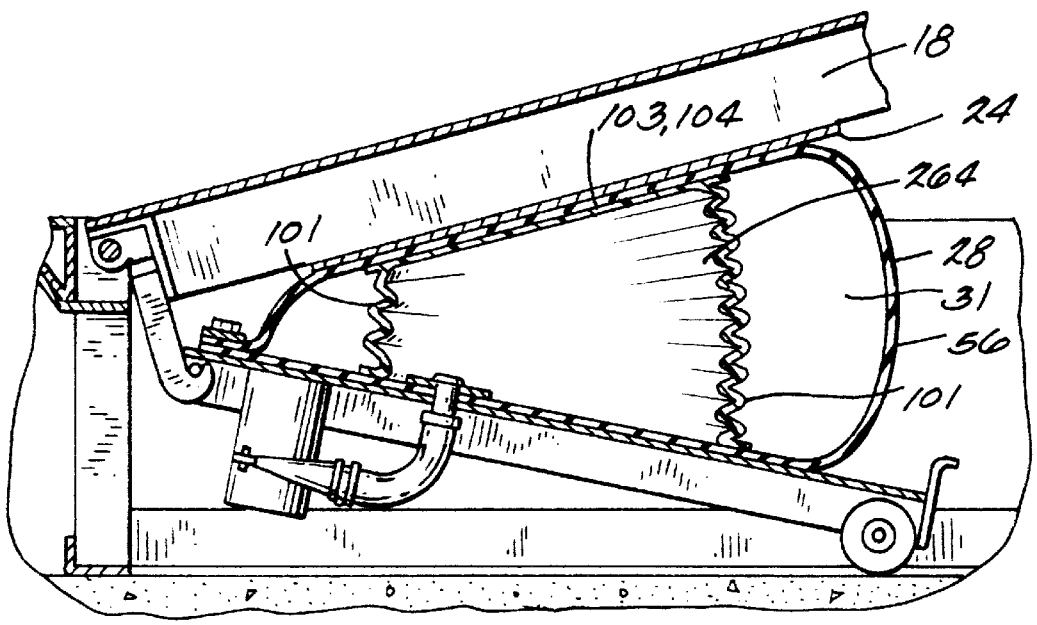
FIG. 5 is a section view of an alternative embodiment of the invention in which the inflatable member is a single bag and the insert member is a bellows structure.

In each of the alternative embodiments shown in FIGS. 4 and 5, the dock leveler includes an inflatable member comprising a single bag. Insert members are positioned within the internal cavities of the bags. In FIG. 4, the insert member 164 is a plurality of compression springs of varying heights. The springs 164 closest to the lip of the ramp 18 are taller than the springs 164 closer to the pivot end of the ramp 18. To keep the springs 164 upright, the terminal ends are attached to bag walls 56 by appropriate means. The bag walls 56 may be provided with additional padding 78 at locations where the springs 164 are attached to prevent puncturing of the bag wall 56.

In the alternative embodiment shown in FIG. 5, the dock leveler includes an insert member 264 in the form of a bellows-like structure positioned within the internal cavity 31 of the bag 28. The bellows 264 is constructed with sufficient resiliency and compressibility to maintain the bag 28 in a raised, non-collapsed position. The height of the bellows 264 varies in that the height of its walls gradually become shorter, starting from the point closest to the lip of the ramp 18 where its is tallest, to the opposite end, near the pivot end of the ramp 18, where it is shortest. The bellows 264 is also constructed so as to occupy the majority of the volume in internal cavity 31. An area 103 defined by the top circumference of the bellows 264 may be enclosed with a rigid surface 104 for maintaining the upper surface of the bag 28 in full engagement with the pressure plate 24 on the underside of the ramp 18.

Operation of the invention may be illustrated with reference to the first embodiment as shown in FIGS. 1–3. At a rest position, which can be in a horizontal or non-horizontal position, the ramp 18 is not supported by the bag assembly 28. The insert members 64 maintain bag assembly 28 in a raised, non-collapsed position in which the bottom wall 63 of the lower bag 32 is in engagement with the support plate 38 and the upper wall 62 of the upper bag 30 is in engagement with the lower surface of the pressure plate 24. In this arrangement, there is no gap or space between the upper wall 62 and the pressure plate 24 which would otherwise collect debris or objects which could puncture the bag 30 upon inflation.

To inflate the bag assembly 28, the inflating device 36 or other means is operated to deliver a gas such as air into the interior the of lower bag 32 through the discharge of the outlet nipple 50. Gas flows through the cut-out 74 of the lower bag 32 and then through the openings 60 into the upper bag 30. Continued operation of the inflating device 36 fully inflates the bags 30 and 32. The ramp 18 is lifted by gas pressure within the internal cavities 31, 33 acting on the walls of the bag assembly 28 and engagement of the bag assembly 28 between the support plate 38 and the pressure plate 24. The insert members 64 positioned within the internal cavities 31, 33 ensure that the bag assembly 28 is initially in a raised, non-collapsed condition. Therefore, the idle time which would otherwise be necessary to inflate the bag assembly 28 from its collapsed position is eliminated and the raising of the ramp 18 is expedited.

Once the ramp 18 reaches its raised position (FIG. 1), operation of the inflating device 36 is discontinued and the ramp 18 is lowered. During such lowering of the ramp 18, gas is exhausted through the inflating device 36 and the insert members 64 are compressed to a lower position (FIG. 3). At all times, the insert members 64 function to prevent the bags 30 and 32 from fully collapsing. The insert members 64 also prevent the bags 30 and 32 from folding which results in longer bag lives. Upon subsequent inflation of the bags 30, 32, the insert members 64 return to their expanded condition as shown in FIG. 1 due to the resiliency of the material or structure making up the insert members 64.

Figure 6:
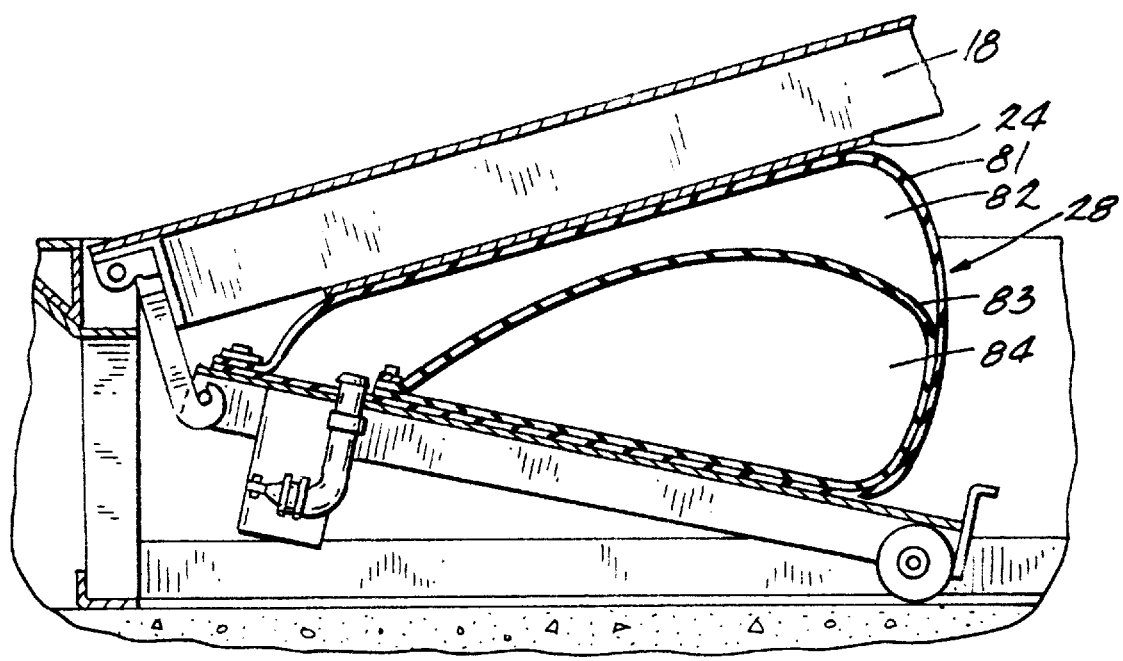
FIG. 6 is a section view of an alternative embodiment in which the inflatable member is a bag assembly comprised of an outer bag and an inner bag. The inner bag is maintained in an inflated condition and functions as an insert member.

In an alternative embodiment shown in FIG. 6, the inflatable member 28 is a bag assembly comprising an outer bag 81 defining an internal cavity 82 and an inner bag 83 defining a second internal cavity 84. The bag assembly 28 further comprises means for delivering pressurized gas to each of the internal cavities 82, 84, when the inflating device 36 is operated. When operation of the inflating device 36 ceases, gas is removed from the internal cavity 82 of the outer bag 81 while the internal cavity 84 of the inner bag 83 remains fully inflated. When the extension lip of the ramp 18 is disengaged from the bed of the truck, the weight of ramp 18 acts to compress and deform the inner bag 83 until the ramp 18 is in its normal rest position. The inner bag 83 can be made of a resilient material to accommodate deformation of the inner bag 83. Because the inner bag 83 remains fully inflated, the volume of gas required in the subsequent filling operation is reduced and moving of the ramp 18 to its raised position is expedited. In this respect, the inner bag 83 functions as an insert member in the same manner as foam material, compression springs or a bellows-like structure in alternative embodiments.

In a variation of the above alternative embodiment in FIG. 6, the bag assembly 28 further includes insert members (not shown) positioned within the internal cavities 82, 84. The insert members act in conjunction with the inflated inner bag 83 to maintain both the outer bag 81 and the inner bag 83 in a raised, non-collapsed condition. In an application where the bag assembly 28 is not secured to the underside of the ramp 18, the insert members also keep the upper surface of the bag assembly 28 engaged with the downwardly facing surface 24 of the ramp 18 when the ramp 18 is in the rest position.

Figure 7:
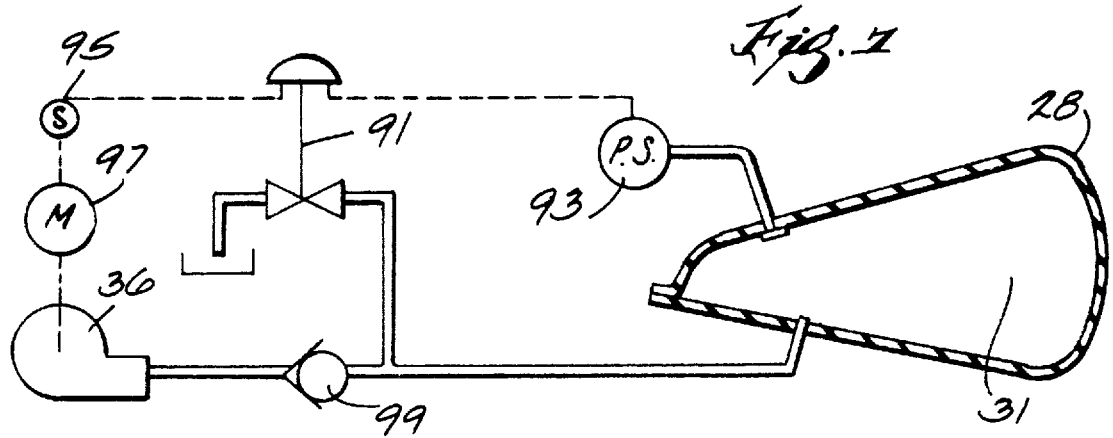
FIG. 7 is a schematic of an alternative embodiment in which the means for maintaining the inflatable member in a raised, non-collapsed position is a combination of a control valve and pressure switch.

In yet another embodiment as shown by the schematic in FIG. 7, the inflatable member 28 further comprises a flow control valve mechanism 91 for maintaining a desired pressure and volume inside the inflatable member 28 and for preventing the inflatable member 28 from collapsing completely when the inflating device 36 is not being operated. As in previous embodiments, the inflating device 36 is operated to inflate the inflatable member 28 with pressurized gas thereby raising the ramp. When the ramp reaches its raised position, the inflating device 36 is shut off. As pressurized gas is exhausted from the internal cavity 31 of the inflatable member 28, the ramp is lowered and the lip is extended to engage the bed of a truck.

In this embodiment, a check valve 99 prevents backflow through the inflating device 36. Pressurized gas is exhausted through the valve 91 until pressure inside the inflatable member 28 is reduced below a predetermined set pressure. At the set pressure, a pressure switch 93, positioned to sense pressure inside the inflatable member 28 triggers the actuator on the valve 91 to close. Consequently, the flow of gas out of the inflatable member 28 is stopped. When the extended lip is disengaged from the truck, the weight of the ramp exerts sufficient pressure on the inflatable member 28 to raise the pressure inside the inflatable member 28 above the set pressure. The pressure switch 93 then triggers the actuator on the valve 91 to open and to allow gas to exhaust from the inflatable member 28 until the ramp is lowered to its normal rest position.

At its normal rest position, the ramp is supported by an external structure. Pressure inside the inflatable member 28 is below the set pressure and valve 91 remains in the closed position. Gas pressure and volume within the internal cavity 31 is retained so that the subsequent operation to move the ramp to a raised operation is expedited.

In order to raise the ramp, pressure inside the inflatable member 28 must rise above the set pressure during operation of the inflating device 36. Therefore, the valve 91 must be kept in the closed position so that gas is not allowed to escape from the inflatable member 28. A second switch 95 senses when the inflating device 36 is operating, i.e. when the motor 97 for the inflating device 36 is energized, and triggers the actuator on the valve 91 to maintain a closed position during this time. Thus, pressure inside the internal cavity 31 is allowed to build which then acts to raise the ramp.

The control valve 91, pressure switch 93 and second switch 95 may be replaced by any conventional means for regulating exhaust flow from an internal cavity. For example, gas could be exhausted through a relief valve which is preset to close at a pressure corresponding to the pressure and volume required to maintain the inflatable member 28 in a raised, non-collapsed position. Alternatively, a two-way valve may be located on the discharge of the inflating device 36. When pressure inside the inflatable member 28 is above the cracking pressure for the valve and the inflating device 36 is not being operated, the pressure differential is sufficient to exhaust the gas back through the valve and through inflating device 36. When pressure inside the inflatable member 28 drops below the cracking pressure, the valve prevents back flow and gas pressure and volume inside the inflatable member 28 is retained.

Alternatively, the pressure within the inflatable member 28 could be monitored, and an inflating device could be activated for brief periods of time to maintain sufficient pressure within the inflatable member 28 to keep it from collapsing. Instead of selectively activating the inflating device, the inflating device could be operated at a slower speed so that only a certain amount of pressure can be maintained in the inflatable device due to designed leakage in the system.

It is understood that the inflatable member could be in any form, such as the bag assembly in the embodiments shown in FIGS. 1, 3 and 6, or the single bag shown in FIGS. 4, 5, and 7. Where the inflatable member is a bag assembly, the bag assembly could have any number of chambers. Moreover, the insert member could be any form of compressible structure or material which will maintain the inflatable member in a raised, non-collapsed position and which will expedite inflation of the inflatable member. In one embodiment, the insert member is formed from an open-cell foam material. In another embodiment, the insert member is a compression spring or a bellows-like structure. In yet another embodiment, the insert member is a plurality of airbags containing pressurized gas. Framework structures made form flexible members or rigid members with flexible joints could also be used. The invention contemplates numerous other embodiments not specifically shown or discussed.

Various alternatives and embodiments are contemplated as being within the scope of the following claims particularly pointing out and distinctly claiming the subject matter regarded as the invention.

What is claimed is:

1. A dock leveler comprising:
    a ramp movable between a lowered position and a raised position;
    an inflatable member positioned to move the ramp to its raised position upon inflation of the inflatable member, the inflatable member including upper and lower portions at least partially defining an internal cavity;
    an inflating device operatively connected with said internal cavity; and
    an insert member positioned in said internal cavity for maintaining a volume of gas between said upper and lower portions.

2. A dock leveler as set forth in claim 1, wherein said ramp includes a downwardly facing surface engageable by said inflatable member, and wherein said insert member functions to maintain said inflatable member in engagement with said downwardly facing surface.

3. A dock leveler as set forth in claim 1, wherein said inflatable member comprises a bag assembly having a plurality of chambers, and wherein said insert member is positioned in at least one of said chambers.

4. A dock leveler as set forth in claim 1, wherein said insert member is wedge shaped.

5. A dock leveler as set forth in claim 1, wherein said insert member comprises a foam material.

6. A dock leveler as set forth in claim 5, wherein said insert member comprises a resilient foam material.

7. A dock leveler as set forth in claim 1, wherein said insert member comprises a compression spring.

8. A dock leveler as set forth in claim 1, wherein said insert member comprises a bellows.

9. A dock leveler as set forth in claim 1, wherein said insert member comprises an airbag.

10. A dock leveler comprising:
    a ramp movable between a lowered position and a raised position;
    an inflatable member positioned to move the ramp to its raised position upon inflation of the inflatable member, the inflatable member including upper and lower portions at least partially defining an internal cavity;
    an inflating device operatively connected with said internal cavity; and
    means for maintaining a volume of gas between said upper and lower portions, wherein said maintaining means is positioned within said internal cavity.

11. A dock leveler as set forth in claim 10, wherein said ramp includes a downwardly facing surface engageable by said inflatable member, and wherein said maintaining means functions to maintain said inflatable member in engagement with said downwardly facing surface.

12. A dock leveler as set forth in claim 10, wherein said inflatable member comprises a bag assembly having a plurality of chambers, and wherein said maintaining means is positioned within at least one of said chambers.

13. A dock leveler as set forth in claim 10, wherein said maintaining means is wedge shaped.

14. A dock leveler as set forth in claim 10, wherein said maintaining means comprises a foam material.

15. A dock leveler as set forth in claim 14, wherein said maintaining means comprises a resilient foam material.

16. A dock leveler as set forth in claim 10, wherein said maintaining means comprises a compression spring.

17. A dock leveler as set forth in claim 10, wherein said maintaining means comprises a bellows.

18. A dock leveler as set forth in claim 10, wherein said maintaining means comprises an airbag.

* * * * *